United States Patent [19]

Adam

[11] Patent Number: 4,921,009

[45] Date of Patent: May 1, 1990

[54] TORQUE CONTROL SYSTEM

[76] Inventor: Gunter H. Adam, 1342 Rutledge Ave., Charlotte, N.C. 28211

[21] Appl. No.: 280,748

[22] Filed: Dec. 7, 1988

[51] Int. Cl.⁵ .................. F16K 37/00; F01B 25/02
[52] U.S. Cl. ...................... 137/557; 137/561 R; 137/599; 137/624.11; 91/6; 60/409
[58] Field of Search ............ 137/557, 599, 624.11, 137/561 R; 60/407, 409; 91/6, 31

[56] References Cited

U.S. PATENT DOCUMENTS

| 2,148,509 | 2/1939 | Shafer | 137/599 X |
|---|---|---|---|
| 2,402,187 | 6/1946 | Siver | 137/557 X |
| 2,731,952 | 1/1956 | Szabo | 91/31 |
| 2,831,501 | 4/1958 | Gommere et al. | 137/561 R |
| 3,010,316 | 11/1961 | Snyder | 137/599 X |
| 3,129,722 | 4/1964 | Wagner | 137/557 |
| 3,304,051 | 2/1967 | Calhoun | 60/407 X |
| 3,581,501 | 6/1971 | Kruger | 60/409 X |
| 3,807,451 | 4/1974 | Howlett | 137/624.11 |
| 3,870,072 | 3/1975 | Lindeman | 137/557 |
| 3,921,335 | 11/1975 | Hewitt et al. | 91/31 X |
| 3,941,031 | 3/1976 | Haddenhorst | 91/6 |
| 3,948,207 | 4/1976 | St. Paul | 137/557 X |
| 3,963,043 | 6/1976 | Cota et al. | 137/557 X |
| 4,011,883 | 3/1977 | Petrimaux et al. | 137/599 X |
| 4,201,051 | 5/1980 | Hall | 60/407 |
| 4,481,768 | 11/1984 | Goshorn et al. | 60/407 X |
| 4,777,383 | 10/1988 | Waller et al. | 137/557 |

FOREIGN PATENT DOCUMENTS

0109900  8/1980  Japan ....................... 137/557

Primary Examiner—John Rivell
Attorney, Agent, or Firm—Clifton Ted Hunt

[57] ABSTRACT

A system for controlling the amount of torque applied by a hand-held power tool to fasteners during an assembly of parts. In the preferred embodiment, a torque control circuit is operated by air to deliver a selected volume of air under selected pressure to the tool and to stop the delivery of air when the desired torque has been applied to the fastener. The system can operate one or more torque control circuits. Visual color coded signals can be used to indicate the active circuit and the tools intended to be used with that circuit.

7 Claims, 6 Drawing Sheets

TORQUE CONTROL SYSTEM

FIELD OF THE INVENTION

This invention relates to a control system for selectively controlling the amount of torque applied to fasteners.

BACKGROUND OF THE INVENTION

It is customary to use pneumatically driven tools in the assembling of fasteners, such as nuts and bolts, to connect parts in an assembly line operation. Machines are designed to be built with each fastener receiving a specific amount of torque, which may differ from fastener to fastener. Insufficient torque results in loose screws. Too much torque strips the threads.

It is generally left to the discretion of the operator to apply the proper amount of torque to each fastener. A skilled operator can judge the proper amount of torque by the sound of the tool and by the length of time air is delivered to the tool. The necessary skill is lost with a turnover in personnel, resulting in defective parts.

Most manufacturers employ full time quality control inspectors to insure that the bolted assembly is within torque specifications. Many quality control inspectors use a click-type torque wrench to measure the torque. This provides a satisfactory test for insuring a minimum torque up to 100 foot pounds of pressure, but it cannot indicate excessive torque, which might overstress the bolt or strip the threads.

The repeated use of a click-type torque wrench to apply 100 foot pounds of pressure throughout the day is so tiring that a quality control inspector may make measurements toward the end of the day that vary from the true torque by as much as twenty five percent.

The additional labor expense of hiring full time quality control inspectors and the ineffectiveness of using click-type torque wrenches can be overcome by installing computer operated assembly machines with built-in torque control that is accurate within a tolerance of five percent. The principal objection to such machines is their cost, which renders them unavailable to all but the larger manufacturers.

SUMMARY OF THE INVENTION

According to the present invention, an unskilled operator is enabled to deliver a predetermined torque through a hand held power tool to a fastener with almost the accuracy of a computer-controlled assembly machine.

The control panel of this invention is useful with all air driven impact tools, including stall-type angle wrenches, screwdrivers, and nutrunners, and specifically air over hydraulic pulse tools.

In use, an operator turns a single selector switch to deliver any one of several predetermined torque values to the hand-held power tool being used by an operator. Any or all of the torque settings in the system may have a positive shut-off valve which is activated to stop the delivery of air when a desired torque is applied.

The torque range of the control system is limited only by the power of the tool used. Screwdrivers with low inch/pounds torque ratings as well as large impact tools of as much as 80,000 foot pounds capacity can be satisfactorily operated with the torque control system of this invention.

Unskilled workers can effectively operate the control system with a minimum of instruction and quality control inspectors need spot check only a few pieces each day.

DETAILED DESCRIPTION OF THE INVENTION INTRODUCTION

The torque control system of this invention has been successfully used with air driven tools generally used on assembly lines where a supply of air is available. For convenience, the controls in the torque control system may also be pneumatically driven, or otherwise as desired.

The invention comprises a panel which controls the power, speed, and the precise shut-off point of each air tool connected to it. The torque delivered by an air tool or pneumatic tool can be controlled by the pressure and volume of air delivered to the tool and by limiting the operating time of the tool. The control panel, broadly indicated at P, controls all three of these functions.

The air supplied to most assembly lines has a fluctuating air pressure due to the number of tools used at a specific moment requiring varying amounts of air. Air compressors usually produce air at a pressure of 100 psi, but the air that reaches the last station on the assembly line may have dropped to a pressure of 80 psi because of friction loss and because of the demands of air by tools at the preceding stations. A pressure loss of 20 psi represents a twenty five percent power loss at the last station.

For this reason, the torque control system of this invention uses the lowest available air pressure as its starting pressure to assure a stable air supply. For the same reason, tools are selected for each station that provide the needed power at 75-80 psi for the highest torque requirement of that station. If the second or subsequent torque requirements are only 50 percent or less of the tool capacity, the air pressure is lowered with regulators until the desired lower power level is reached with the same tool.

A positive shut-off, at a predetermined torque level, can be provided in any of the air lines by installing an adjustable timer in the circuit providing the desired torque. The timer is repeatedly adjusted until the air is reliably shut off at the desired torque setting. For example, a self-tapping screw requires more power due to the extra friction generated, so the power of the tool is set much higher in order to get a good production rate with a fast rundown. The precision timer is set to shut off the tool just before the threads would strip or the screw would break. This is especially effective with soft hitting pulse tools, which have not been previously used for self-tapping jobs because of their slow rundown speed.

A similar situation exists on steel erection jobs. Most of the flanges on an I-beam are distorted by the welding process. The flanges have to be drawn together with ten to twenty bolts to connect the beams. The bent flanges have a "soft joint" effect that falsely indicates to a standard torque-sensing tool a higher torque than actually exists. The first bolt is loosened again by the time all bolts have been tightened and the flanges are straightened.

With the present torque control system and its associated timing circuit, each bolt is first pre-tightened just enough to straighten the flanges. Then, each bolt is given a final tightening, with the desired torque selected from the control panel, to provide a tight I-beam connection and a safe structure.

STRUCTURAL DETAILS

The control system of this invention can accommodate any desired number of circuits, with each circuit equipped to deliver a different torque to the fastener. For convenient explanation, the invention is illustrated and will be described with a torque control system having three torque circuits, each with a different torque setting, to accomplish the intended assembly.

The illustrated embodiment of the torque control system can be operated independently of electricity. The three torque circuits are distinguished on a control panel P by differently colored "air lights" 9, 15, and 21. The "air lights" are not electric lights. They are energized by air instead of electricity. The effect of an electric light is obtained by painting a lightweight plastic cap with a fluorescent color. The painted cap is supported on a normally retracted spring, which holds the painted cap in spaced relation behind the transparent lens of an "air light" in the panel P. When the air circuit to be indicated by that "air light" is pressurized, the air pressure extends the spring and flips the colored cap against the inside of the lens. The energized "air light" appears to light up and glow.

Torque Circuit No. 1

Figure 1:
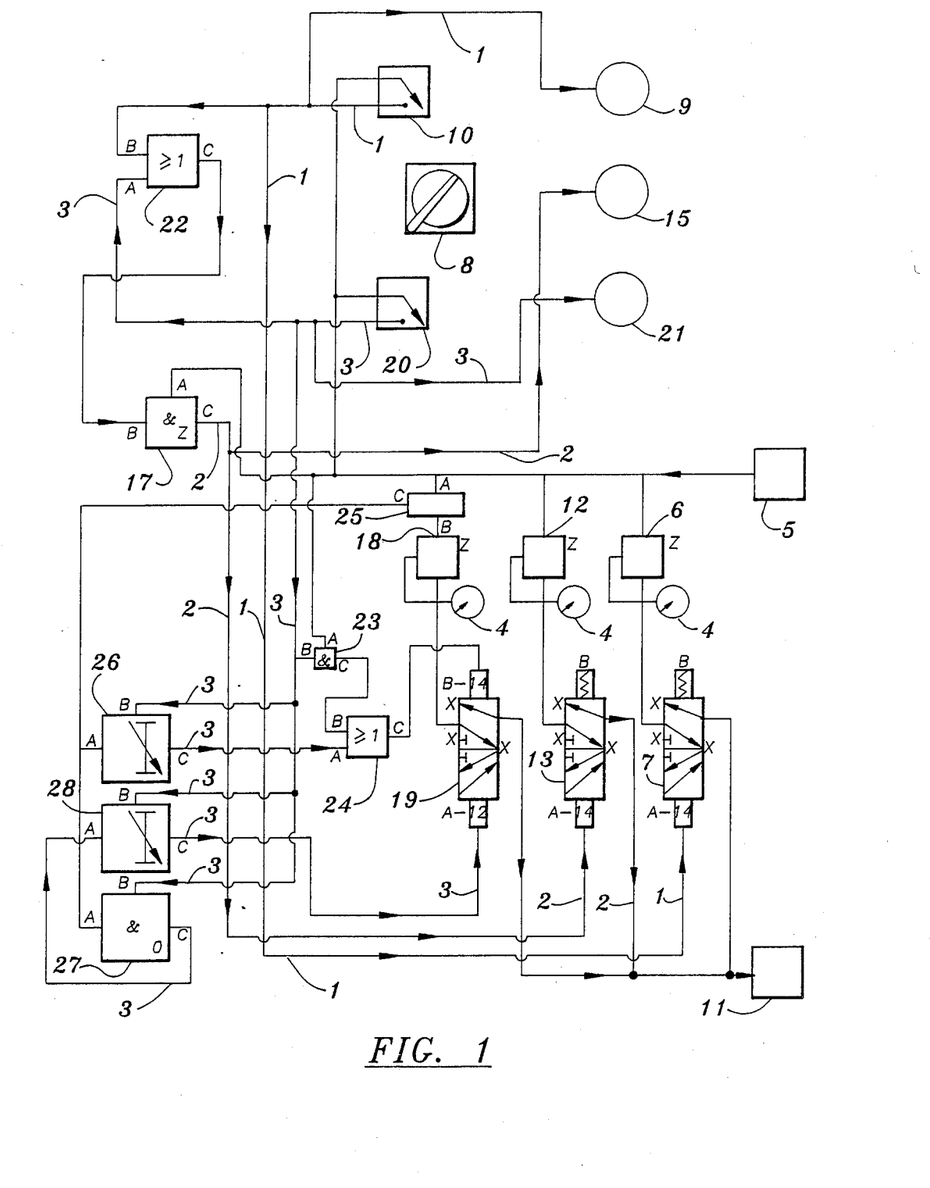
FIG. 1 is a schematic diagram of the piping in an exemplary control system of this invention, associated with a selector switch and a positive shut-off timing circuit.
Figure 2:
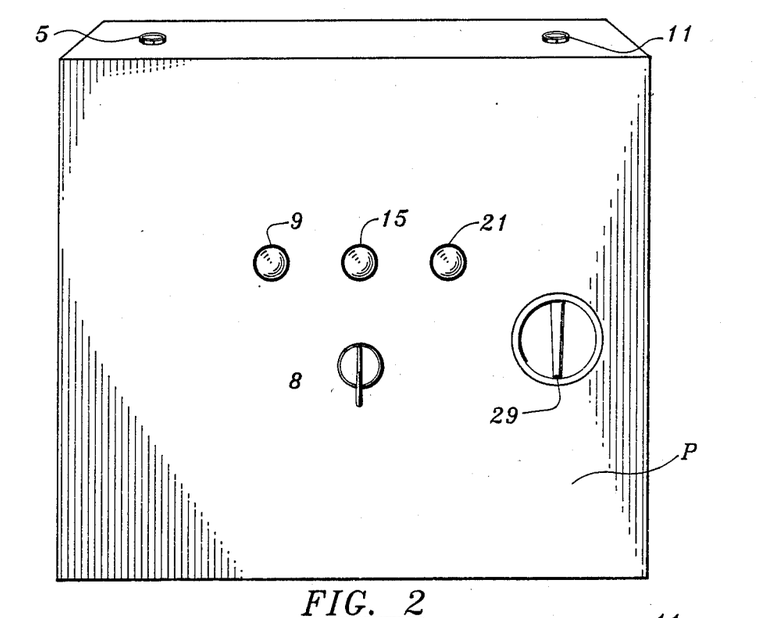
FIG. 2 is a front view of a three position panel.
Figure 3:
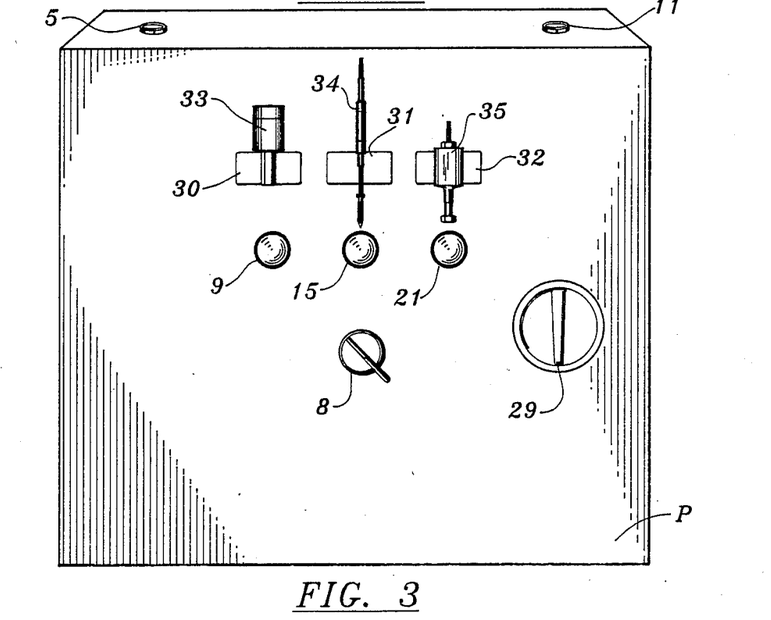
FIG. 3 is a front view of the panel shown in FIG. 2, illustrating the removable attachment of color coded accessories to the panel.
Figure 4:
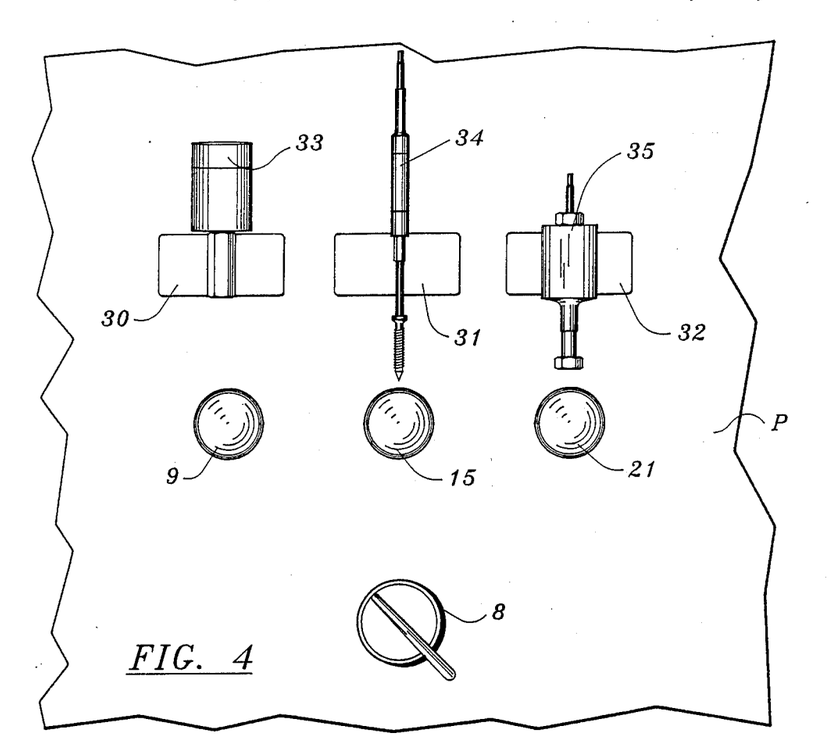
FIG. 4 is an enlarged fragmentary front view of the panel and accessories shown in FIG. 3.

Referring to FIGS. 2, 3, and 4, a selector switch 8 on the control panel P has been set to point toward "air light" 9 to indicate the operator's selection of the torque provided by the torque circuit indicated at 1 in FIG. 1. The assigned color of "air light" 9 represents torque circuit 1.

A fluctuating air supply enters the control system through an inlet port 5. Turning the selector switch 8 toward setting 9 closed and energized a switch 10, causing pilot air to flow from switch 10 to port A/14 of a 2-position/4-way valve 7. Meanwhile, the pressure of the air entering the system is stabilized by pressure regulator 6 and the controlled air pressure flows into valve 7.

The pressure of the pilot air from valve 10 compresses the spring on side B of valve 7, causing the valve to open and meter supply air through outlet port 11 to the air tool.

When the operator pulls the trigger of the air tool, the tool will tighten the bolt to the specific torque level set by the pressure regulator 6. The socket stops turning when the desired torque is applied to the bolt. The operator releases the trigger of the tool to complete the cycle.

All valves stay in the same position until the operator turns the selector switch 8 to another position to activate a different torque circuit. Circuit 1 does not contain a timed shut-off.

Torque Circuit No. 2

When selector switch 8 is pointed toward "air light" 15 on the panel P to activate torque circuit 2, the fluctuating air supply entering the torque control system through inlet port 5 is stabilized by pressure regulator 12 and controlled air pressure flows to a 2-position/4-way valve 13.

Meanwhile, pilot air is at threshold-not-valve 17, port A. Torque circuits 1 and 3 are not pressurized with the selector switch 8 set to activate circuit 2. This means that air can flow only from port A through port C of valve 17 to energize the color coded "air light" 15 for circuit 2. At the same time, the spring on side B of valve 13 is compressed by the air pressure in circuit 2 to open valve 13 and meter supply air through outlet pool 11 to the tool.

The air tool tightens the bolt to which it is applied to the predetermined torque value of circuit 2. The socket on the tool stops turning when the desired torque has been obtained. All valves stay in the same position until the selector switch 8 is moved to activate a different torque circuit. Circuit 2 does not contain a timed shut-off.

Circuits 1 and 2 are ideal for "hard joint" bolting conditions. A free running nut or bolt rapidly fastens parts together with the prescribed torque value, after which the tool socket stops turning.

Torque Circuit No. 3

When the selector switch 8 is turned toward color coded "air light" 21 to activate torque circuit 3, the supply air entering the system through inlet port 5 moves past a flow sensor valve 25 to pressure regulator 18 which, in turn, delivers air under the selected pressure to 2-position/4-way valve 19.

Meanwhile, the air in circuit 3 closes switch 20 and energizes the color coded "air light" 21 as the air flows from the switch 20 to timer 28, port B, timer 26, port B, not-gate-valve 27, port B and or-gate-valve 22, port A. The first circuit 1 is not pressurized, so the port B on or-gate-valve 22 is closed. Air goes from port A, past port C of or-gate valve 22, to port B at threshold-not-gate-valve 17. The air pressure at port B of threshold-not-gate valve 17 keeps port A and port C closed and prevents air from energizing "air light" 15 for circuit 2. Air from valve 20 goes to not-gate-valve 23, port B, which prevents air flow from port A to port C of valve 23. The lack of air flowing from port C of valve 23 to port B of or-gate-valve 24 removes pilot air from port B-14 of valve 19.

During the start-up cycle of circuit 3 for the third torque setting, there is no air pressure at port A of timer 26 and port A of not-gate-valve 27. This condition lets air go from port C at not-gate-valve 27 to port A of timer 28, causing the timer 28 to start the 1 to 3 second delay cycle. At the end of the time cycle, the snap-action timer closes port A of timer 28 and lets the air flow from port B past port C of timer 28 to port A-12 of valve 19. This air will open the valve 19 and allow controlled supply air to flow through the valve 19, past outlet 11, to the air tool.

When the trigger is pulled on the air tool, air moves through the flow sensor valve 25, which sends an air signal to port A of tool timer 26 to start the timing cycle of the tool. An air signal also goes to port A of the not-gate-valve 27 and shifts the valve to close port C.

Tool timer 26 can be set to operate the tool for any length of time within the range of 0.1 of a second to 30 seconds. At the end of the selected time cycle, the snap-action tool timer 26 closes its port A and closes port A on not-gate-valve 27. The timer 26 lets air flow from port B through port C of the tool timer 26 to port A of or-gate-valve 24, closing port B of the valve 24. Air goes from port A through port C of or-gate-valve 24 to port B-14 at valve 19. Valve 19 is activated to instantly shut off the flow of air to the air tool.

The stoppage of air flow to the tool exhausts the air signal to port A of tool timer 26 and exhausts the flow of air through port A of not-gate-valve 27. The flow of air resumes from port B through port C of the not-gate-valve 27 to port A of the delay timer 28 and starts the time delay cycle, which stops the tool for a predetermined length of time while the operator moves the tool to the next bolt and starts the next cycle. At the end of the time cycle, the snap-action timer will close port A and let air flow from port B through port C of valve 28 to port A-12 of the 2 position/4-way valve 19. This air signal will shift the valve and the cycle of circuit 3 is completed.

ADVANTAGES AND FEATURES OF THE INVENTION

The torque control system described above can easily be customized to the specific torque requirements of any assembly job requiring the application of specific torques to different fasteners.

The size of the box is determined by the number of air circuits. Valve sizes depend on the air volume needed to run the tool efficiently without creating a pressure drop due to orifice restrictions.

One popular size box has a ⅜" air inlet 5 and a ⅜" air outlet 11. This size is sufficient to give up to 1,000 foot pounds of torque with a ¾" impact tool. Larger tools may need valves and fittings up to two inches in size and the box has to be big enough to hold them. These sizes are exemplary only. The piping and other components of the torque control system can be of any size needed to accomplish the intended purpose of monitoring and controlling different torque requirements.

The working pressure of the torque control system is stabilized by keeping the pressure regulator setting of each air circuit lower than the lowest air pressure available from the air supplied to the system.

The tool selected for the multi-torque requirement should have about 25% more power than the highest torque needed. This will leave room for a power adjustment when the tool begins to wear and will extend the life of the tool since it does not operate at full power all the time.

A "hard joint", with solid steel mating surfaces and a low friction nut rundown condition, will give good torque repeatability with the basic regulated circuit #1 and #2, when the operator shuts off the tool after the socket quits turning. However, a "soft joint" with gaskets, multi layers of thin material and self tapping screws etc. requires the positive shut-off circuit #3. A snap-action pneumatic timer will cut the air supply to the tool instantly. An adjustable time delay circuit and an instant reset circuit is available and either will be activated when the operator takes the finger off the trigger of the air tool. The proper pressure selection of each air circuit has to be made on the job, but only one time, in order to match the different working conditions.

The "air lights" are activated to indicate when air is supplied to a circuit. The selector switch 8 changes circuits and simultaneously energizes the corresponding "air light" to visually indicate the active torque control circuit.

The new air over hydraulic pulse tools give this system an additional adjustment. The internal adjustment valve of the hydraulic pulse unit can be set to supply hard pulses even at low air pressure settings, thereby increasing the rundown speed on soft joints and self-tapping screws. Pulse tools have no torque reaction like stall tools do. That prevents injuries due to the carpal tunnel syndrome (wrist injuries).

Figure 5:
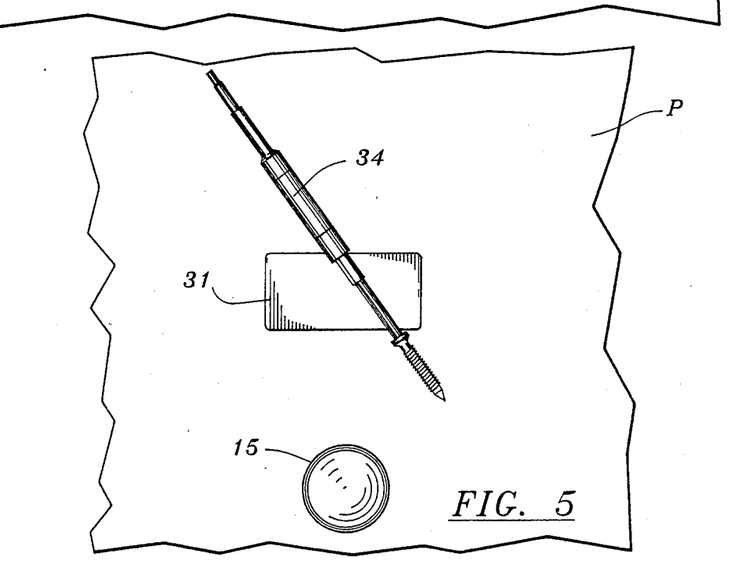
FIG. 5 is an enlarged fragmentary front view of one of the accessories attached to the panel in FIGS. 3 and 4.
Figure 6:
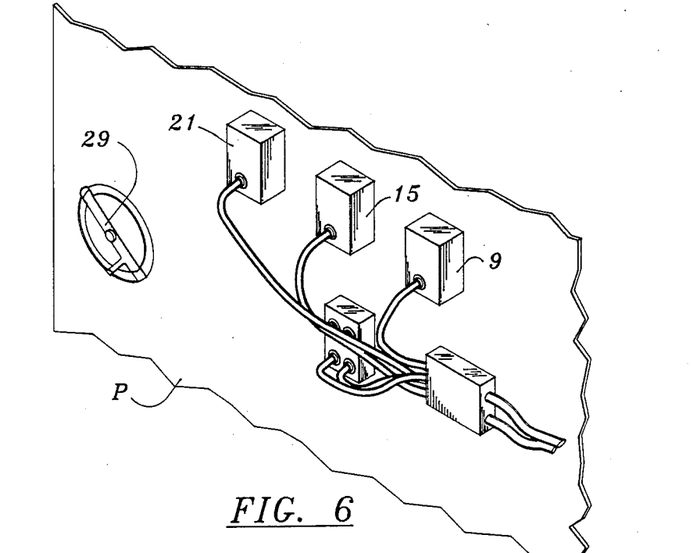
FIG. 6 is a rear elevation looking at the inside of the panel door shown in FIGS. 1-5.
Figure 7:
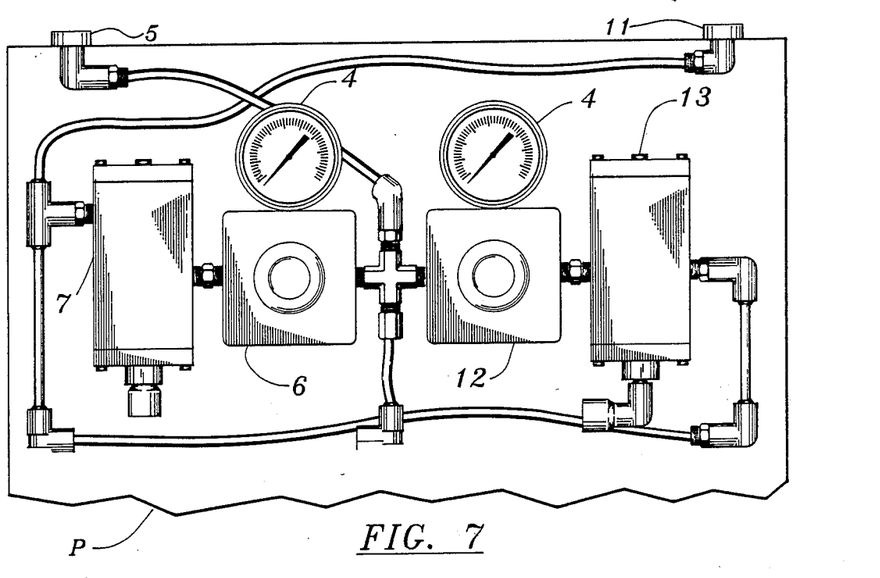
FIG. 7 is a fragmentary front elevation view, with parts broken away, of a portion of the piping layout in the control system and its associated valves and pressure regulators.
Figure 8:
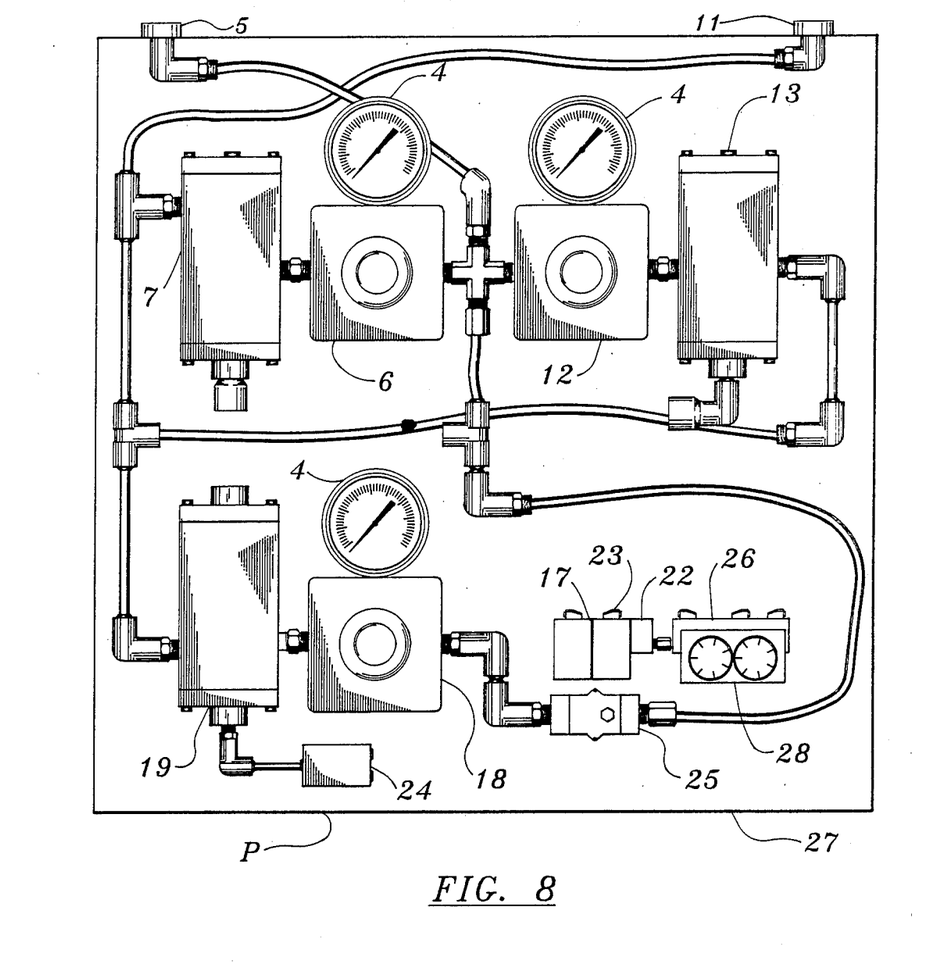
FIG. 8 is a full front elevation view of the piping layout in the control system and its associated valves and pressure regulators.
Figure 9:
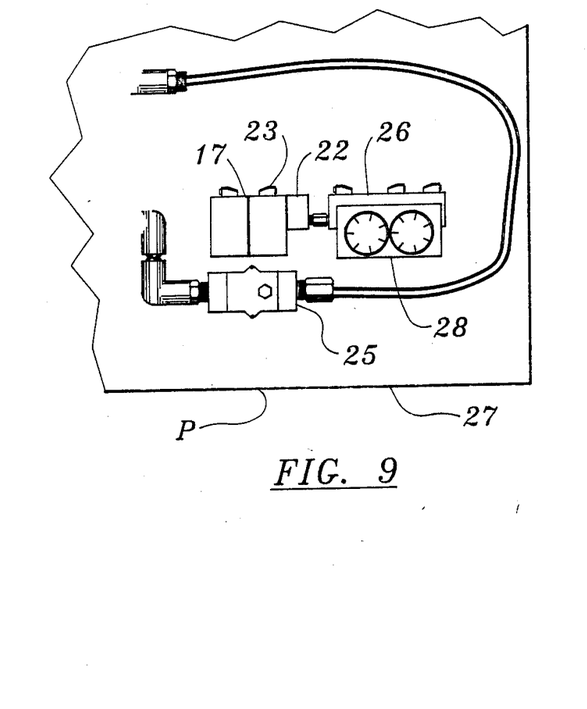
FIG. 9 is an enlarged fragmentary view, with parts broken away, looking at the positive shut-off in the lower right corner of FIG. 8.

A color coding system is helpful, especially for a new operator. Differently colored magnets 30, 31, and 32 may be attached to the panel P near correspondingly colored "air lights" 9, 15, and 21, as shown in FIG. 3, for example. Each of the magnets removably supports the tool or accessory intended to be operated by the air circuit indicated by its correspondingly colored "air light". The tools and accessories supported by the magnets may also be correspondingly colored. For example, a green colored screwdriver bit 34, which is needed to tighten screws to a specific torque will be held on the panel near a green colored "air light" 15 by a green colored magnet 31, as shown in FIGS. 4 and 5. The color coding enables an inexperienced operator to consistently apply the intended torque to each fastening by simply matching colors.

An electrically operable Universal Torque Read-Out Unit can be connected between the tool spindle and the drive socket. A printer will record the date, time, and torque value of every bolt on paper tape and a digital display tells the operator of a standard hand-held pulse tool, angle wrench, stall tool, screwdriver, etc. the exact torque the tool has produced.

SUMMARY

There is thus provided a torque control system that enables even an inexperienced operator to consistently apply the intended torque to each fastener of an assembly. The system can be produced economically without any electrical connections and provides monitoring and control of torque applications with a consistency and tolerance comparable to that of much more expensive computer-controlled torque control systems.

Although specific terms have been used in describing the illustrated embodiment of the invention, they have been used for descriptive purposes only and not for the purpose of limitation. It is recognized that changes can be made in the structure and operation of the illustrated system within the scope of the appended claims without departing from the spirit of the invention.

I claim:

1. A torque control system for controlling the amount of torque imparted by an air tool to fasteners to be tightened with a specific torque for the connection of parts during an assembly of parts, said torque control system comprising:
(a) a supply of air;
(b) a plurality of torque circuits within the system;
(c) a control panel;
(d) a selector switch for actuating a selected torque circuit;
(e) means for delivering supply air to the selected torque circuit;
(f) means for stabilizing the air pressure within the selected torque circuit;
(g) means for regulating the volume and pressure of air within the selected torque circuit to predetermined values;
(h) means for delivering air at predetermined values of volume and pressure from the selected torque circuit to the tool; and
(i) means for timing the delivery of air to the tool and stopping the tool after a predetermined time of operation.

2. A torque control system according to claim 1 wherein an "air light" is displayed on the control panel for each torque circuit, and means responsive to movement of the selector switch for activating a selected circuit and its respective "air light".

3. A torque control system according to claim 2 wherein the "air lights" are color coded to identify their respective torque circuits with specific torque values.

4. A torque control system according to claim 3 wherein tool accessories are color coded to correspond with the color of the "air light" designating the torque circuit with which each tool accessory is intended to be used.

5. A torque control system according to claim 4 wherein means are provided for releasably mounting the color coded tool accessories on the control panel.

6. A system which tightens fasteners to a specific tolerance of torque with an air tool, said system including:
(a) a supply of air;
(b) at least one torque circuit;
(c) means for delivering air through the torque circuit to the air tool;
(d) means for stabilizing the volume and pressure of air within the torque circuit for delivery to the air tool at selected values, and
(e) means within said torque circuit for timing the delivery of a selected volume and pressure of air to the tool and for stopping the tool after a predetermined time of operation, said timing means including a plurality of interconnected valves arranged to open and close sequentially in response to the selection of a specified time of operation.

7. A system according to claim 6 which includes means within the torque circuit for regulating the cycle time of the air tool between operations.

* * * * *